(12) United States Patent
Kim et al.

(10) Patent No.: US 11,095,218 B2
(45) Date of Patent: Aug. 17, 2021

(54) LOW-POWER DC-DC CONVERTER CAPABLE OF PREVENTING REVERSE CURRENT WITH DIGITAL OPERATIONS AND METHOD OF OPERATING THE SAME

(71) Applicant: ABOV SEMICONDUCTOR CO., LTD., Cheongju-si (KR)

(72) Inventors: Hong Jin Kim, Cheongju-si (KR); Suk Kyun Hong, Seoul (KR); Hyun Kyu Kim, Cheongju-si (KR); Eung Oh, Cheongju-si (KR); Suk Yun, Cheongju-si (KR)

(73) Assignee: ABOV SEMICONDUCTOR CO., LTD., Cheongju-si (KR)

( * ) Notice: Subject to any disclaimer, the term of this patent is extended or adjusted under 35 U.S.C. 154(b) by 0 days.

(21) Appl. No.: 16/255,342

(22) Filed: Jan. 23, 2019

(65) Prior Publication Data

US 2019/0229607 A1 Jul. 25, 2019

(30) Foreign Application Priority Data

Jan. 23, 2018 (KR) .......................... 10-2018-0008376

(51) Int. Cl.
*H02M 3/158* (2006.01)
*H02M 1/38* (2007.01)
(Continued)

(52) U.S. Cl.
CPC ........... *H02M 3/158* (2013.01); *H02M 1/088* (2013.01); *H02M 1/38* (2013.01); *H02M 3/1588* (2013.01); *H02M 1/0048* (2021.05)

(58) Field of Classification Search
CPC ........ H02M 1/08; H02M 1/082; H02M 1/083; H02M 1/38; H02M 2001/0048;
(Continued)

(56) References Cited

U.S. PATENT DOCUMENTS 7,224,149 B2  5/2007 Endo
7,872,461 B2  1/2011 Yamada
(Continued)

FOREIGN PATENT DOCUMENTS

JP  2009-290986  12/2009
JP  5422922 B2  2/2014
(Continued)

OTHER PUBLICATIONS

Hen, Po-Hung, et al. (Feb. 2016). "A 50 nW-to-10 mW Output Power Tri-Mode Digital Buck Converter With Self-Tracking Zero Current Detection for Photovoltaic Energy Harvesting", IEEE Journal of Solid-State Circuits, 51 (2):523-532.

*Primary Examiner* — Gustavo A Rosario-Benitez
(74) *Attorney, Agent, or Firm* — Nelson Mullins Riley & Scarborough LLP; Kongsik Kim, Esq.

(57) ABSTRACT

A low-power direct current-direct current (DC-DC) converter includes a capacitor, an inductor electrically connected to the capacitor, a first switch configured to be turned on for a first switching interval and supply energy from an input power source to the inductor for the first switching interval, a second switch configured to be turned on for a second switching interval and electrically connect the inductor and a ground terminal for the second switching interval, and a switching control circuit configured to generate first and second switching signals. The switching control circuit is further configured to generate a first sample signal by sampling the voltage level of a first node, and to determine, responding to the first sample signal in time domain, an pulse width adjustment adapted to adjust at least one of the length of a second switching interval and the length of a common blocking interval.

9 Claims, 10 Drawing Sheets

(51) Int. Cl.
*H02M 1/00* (2006.01)
*H02M 1/088* (2006.01)

(58) Field of Classification Search
CPC ............... H02M 3/158; H02M 3/1588; H02M 2001/0025; H02M 3/157; H02M 2001/0054; H02M 2001/0058; H02M 3/155
See application file for complete search history.

(56) References Cited

U.S. PATENT DOCUMENTS

| | | | |
|---|---|---|---|
| 8,564,270 B2 | 10/2013 | Kesterson et al. | |
| 8,582,329 B2 | 11/2013 | Gao et al. | |
| 2008/0049473 A1* | 2/2008 | Sugahara | H02M 3/156 363/89 |
| 2008/0158914 A1* | 7/2008 | Bakker | H02M 3/33515 363/17 |
| 2008/0211473 A1* | 9/2008 | Tlasksl | H02M 1/38 323/283 |
| 2009/0027024 A1* | 1/2009 | Dequina | H02M 3/1588 323/283 |
| 2012/0025797 A1* | 2/2012 | Futamura | H02M 3/156 323/283 |
| 2014/0028270 A1* | 1/2014 | Miyazaki | G05F 1/10 323/271 |
| 2015/0318785 A1* | 11/2015 | Svorc | H02M 3/158 323/235 |
| 2015/0349636 A1* | 12/2015 | Bodano | H02M 3/157 323/271 |
| 2016/0233768 A1* | 8/2016 | de Cremoux | H02M 3/157 |
| 2017/0187284 A1* | 6/2017 | Vaidya | H02M 3/1588 |

FOREIGN PATENT DOCUMENTS

| | | |
|---|---|---|
| KR | 10-2012-0081038 A | 7/2012 |
| KR | 10-1389639 B1 | 4/2014 |
| KR | 10-1550529 B1 | 8/2015 |
| KR | 10-1692169 B1 | 12/2016 |

* cited by examiner

Related Art

LOW-POWER DC-DC CONVERTER CAPABLE OF PREVENTING REVERSE CURRENT WITH DIGITAL OPERATIONS AND METHOD OF OPERATING THE SAME

CROSS-REFERENCE TO RELATED APPLICATION

This application claims under 35 U.S.C. § 119(a) the benefit of Korean Patent Application No. 10-2018-0008376 filed on Jan. 23, 2018, which is incorporated herein by reference.

TECHNICAL FIELD

The present invention relates generally to a highly efficient low-power DC-DC converter and a method of operating the low-power DC-DC converter, and more specifically to a low-power DC-DC converter having a digital self-tracking zero current detection function and a method of operating the low-power DC-DC converter.

BACKGROUND ART

Recently, with the development of mobile devices, the run time of a battery has become a significant issue. The run time of a portable battery is closely related to the low-power operation and efficiency of a power supply circuit. Accordingly, the optimization of the low-power operation of the power supply circuit and the improvement of the efficiency of the power supply circuit are required. In order to optimize low-power operation and achieve high efficiency, the feature size of a process is being reduced to a sub-micron level, and a corresponding digital operation method is becoming a significant issue.

A direct current-direct current (DC-DC) converter having relatively high efficiency among power supply circuits is introduced in FIG. 1.

The DC-DC converter operates in a continuous current mode (CCM) and a discontinuous current mode (DCM) according to a load current ($I_L$) in a state where an inductor ($L_{BUCK}$) has been determined, as shown in FIG. 1.

Recently, in the case of a DC-DC converter in a mobile device, the discontinuous current mode (DCM) becomes an issue because it operates based on a small inductor ($L_{BUCK}$) and a low load ($R_L$). The discontinuous current mode (DCM) operates to turns off one or more intervals in a switching operation cycle of a DC-DC converter, thereby stopping the supply of current and allowing current to be supplied to a load by a capacitor.

In the discontinuous current mode operation of the DC-DC converter, when the current of the inductor deviates from a zero current point or reverse current blocking point, reverse current is generated through NMOS diode conduction or the PMOS diode conduction, and thus an efficiency deterioration problem occurs. Accordingly, the efficiency deterioration problem may be prevented only when a reverse current blocking point can be detected accurately and rapidly.

The conventional discontinuous current mode uses a fast comparator to detect a zero current point. Generally, a serious problem does not occur in a DC-DC converter circuit that supplies high power does not cause because power consumption is relatively low. In contrast, in the case of a DC-DC converter that supplies low power, efficiency may be degraded or an operational problem may occur.

In the case of a comparator for the blocking of reverse current, the accuracy and operating speed of the comparator are important because a reverse current blocking point must be detected. The accuracy of the comparator is important for the accurate detection of the reverse current blocking point. In order to increase the accuracy of the comparator, it is necessary to increase the power consumption of the comparator. However, the current consumption of the DC-DC converter that supplies low power is increased, and thus a problem arises in that the efficiency of the DC-DC converter is degraded.

Similarly, in order to increase the operation speed of the comparator, it is necessary to increase power consumption, and thus a problem arises in that the efficiency of the DC-DC converter that supplies low power is degraded.

Korean Patent No. 10-1692169 entitled "Low-Power DC-DC Converting Apparatus and Method capable of Preventing Reverse Current in Discontinuous Current Operation Mode" discloses a remarkable related art that achieves low power by digitizing part of the operation of the DC-DC converter and also replacing an analog comparator.

This related art introduces a configuration in which a comparator is replaced with a D-flip/flop configured to sample the voltage of a VX node, which is a common contact point for first and second switches, based on a second switching signal D2.

However, in this digital operation, an efficiency deterioration problem can be prevented more as a reverse current blocking point is detected more accurately, as in the operation of the analog comparator. Although low-power operation is possible through digital operation, a problem arises in that efficiency reduction is increased when a reverse current blocking point is not accurately detected. In this related art, the voltage of a VX node is sampled using only a plurality of delay signals based on a second switching signal D2, and thus a problem arises that an error corresponding to the time delay generated by a delay circuit is inherent therein. Therefore, there is a need for a technology capable of improving the accuracy of a reverse current blocking point without causing a limitation to accuracy attributable to the time delay of a specific circuit.

SUMMARY OF THE DISCLOSURE

An object of the present invention is to provide a DC-DC converter capable of preventing reverse current with digital operations in a low power supply circuit and a method of operating the DC-DC converter.

An object of the present invention is to provide a method of detecting a reverse current blocking point (timing point) with digital operations in order to overcome the problems of the conventional analog comparator method used to detect a reverse current blocking point in a DC-DC converter, which is a low power supply circuit.

An object of the present invention is to propose a detection method of, when detecting a reverse current blocking point with digital operations, transferring detected information to a subsequent stage without loss, thereby improving the accuracy of a reverse current blocking point.

An object of the present invention is to propose a detection method in which a VX sample signal obtained by sampling the voltage of a VX node, which is a common contact point, is not dependent upon a specific reference signal and information about the operation of the voltage of the VX node in time domain is included, thereby improving the accuracy of a reverse current blocking point.

An object of the present invention is to effectively reduce the time required to reach an equilibrium point at which the error of a reverse current blocking point is minimized.

In the related art, the voltage of the VX node is sampled by means of a D-flip/flop by using delay signals DL1 and DL2 derived from the second switching signal D2. In this case, the time delay between D2 and DL1 and DL2 becomes the sampling interval, so that it is impossible to have resolution smaller than the sampling interval and an error range corresponding to the sampling interval must be generated. Furthermore, in the related art, the pulse width of the second switching signal D2 can be adjusted only by the sampling interval. Accordingly, when the sampling interval is adjusted to an excessively small value, an excessive number of switching cycles are required to reach an optimized reverse current blocking point.

An object of the present invention is to reduce the number of switching cycles required to reach an optimized reverse current blocking point in such a manner that the sampling interval of a VX node and a pulse width adjustment, which is a unit for the adjustment of a pulse width, are separated to be independent of each other, so that time resolution can be increased by reducing the sampling interval and the pulse width can be adjusted variably.

The objects of the present invention are not limited to the above-described objects, and other objects that are not described above will be clearly understood from the following description by those skilled in the art.

According to an aspect of the present invention, there is provided a low-power direct current-direct current (DC-DC) converter, including: a capacitor; an inductor electrically connected to the capacitor; a first switch configured to be turned on for a first switching interval in response to a first switching signal, and to supply energy from an input power source to the inductor for the first switching interval; a second switch configured to be turned on for a second switching interval, other than the first switching interval, in response to a second switching signal, and to electrically connect the inductor and a ground terminal to each other for the second switching interval; and a switching control circuit configured to generate the first switching signal and the second switching signal; wherein the switching control circuit is further configured to generate a first sample signal by sampling the voltage level of a first node where the first switch and the second switch are connected to the inductor by means of a digital sampler circuit, and to determine, responding to the first sample signal in time domain, a pulse width adjustment adapted to adjust at least one of the length of a second switching interval which will be applied to a subsequent switching cycle and the length of a common blocking interval for which the first switch and the second switch are all turned off. In this case, the pulse width adjustment refers to the reference unit of an adjustment operation of adjusting the length of a time interval, as shown in FIGS. 9 and 10.

The switching control circuit may be further configured to determine the pulse width adjustment based on the quantified level of the phase difference between the first sample signal and the second switching signal.

The switching control circuit may be further configured to determine the pulse width adjustment to be a first adjustment time width when the quantified level of the phase difference between the first sample signal and the second switching signal exceeds a threshold value, and to determine the pulse width adjustment to be a second adjustment time width shorter than the first adjustment time width when the quantified level of the phase difference between the first sample signal and the second switching signal is equal to or lower than the threshold value.

The switching control circuit may be further configured to, when the quantified level of the phase difference between the first sample signal and the second switching signal becomes equal to or lower than the threshold value in a first mode (a coarse adjustment mode) in which the pulse width adjustment is determined to be the first adjustment time width, generate a first mode completion signal (a coarse lock signal) indicating that the first mode has been completed and switch to a second mode (a fine adjustment mode) in which the pulse width adjustment is determined to be the second adjustment time width.

The switching control circuit may be further configured to generate a plurality of control signals indicating the quantified level of the phase difference based on the phase difference between the first sample signal and the second switching signal.

The switching control circuit may be further configured to generate the plurality of control signals based on the difference between the phase of the first sample signal and a phase of a second switching delay signal, generated in such a manner that the second switching signal is delayed, by taking into account a parasitic capacitance of the second switch.

The switching control circuit may be further configured to generate a first control signal (an UP signal) having a pulse width activated based on the difference between the phase of the second switching delay signal and the phase of the first sample signal when the phase of the second switching delay signal leads the phase of the first sample signal, and to generate a second control signal (a DN signal) having a pulse width activated based on the difference between the phase of the first sample signal and the phase of the second switching delay signal when the phase of the first sample signal leads the phase of the second switching delay signal.

The switching control circuit may be further configured to increase the length of the second switching interval by the pulse width adjustment when the first control signal is generated, and to reduce the length of the second switching interval by the pulse width adjustment when the second control signal is generated.

The switching control circuit may be further configured to generate a digitized reference pulse selection control signal, in order to generate a second switching reference signal that is a reference for the second switching signal by selecting any one of a plurality of reference pulses by using the plurality of control signals.

According to another aspect of the present invention, there is provided a method of operating a low-power direct current-direct current (DC-DC) converter, the method including: generating a first sample signal by sampling the voltage level of a first node where the first switch and the second switch are connected to the inductor; generating a second switching delay signal based on the second switching signal; detecting a faster one of the first sample signal and the second switching delay signal; detecting the phase difference between the first sample signal and the second switching delay signal; and generating a plurality of control signals indicative of information about the faster one of the first sample signal and the second switching delay signal and quantified information about the phase difference between the first sample signal and the second switching delay signal.

The method may further include determining, responding to the first sample signal in time domain, an pulse width adjustment adapted to adjust at least one of the length of a second switching interval which will be applied to a subsequent switching cycle and the length of a common blocking interval for which the first switch and the second switch are all turned off.

The determining may include determining the pulse width adjustment based on the quantified level of the phase difference between the first sample signal and the second switching signal.

The determining may include: determining the pulse width adjustment to be a first adjustment time width when the quantified level of the phase difference between the first sample signal and the second switching signal exceeds a threshold value; and determining the pulse width adjustment to be a second adjustment time width shorter than the first adjustment time width when the quantified level of the phase difference between the first sample signal and the second switching signal is equal to or lower than the threshold value.

The method may further include generating a first mode completion signal, indicating that a first mode in which the pulse width adjustment is determined to be the first adjustment time width has been completed, when the quantified level of the phase difference between the first sample signal and the second switching signal becomes equal to or lower than the threshold value in the first mode.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE DISCLOSURE

The above and other objects and features of the present invention will be apparent from the following embodiments that will be described with reference to the accompanying drawings.

The embodiments of the present invention will be described in detail below with reference to the accompanying drawings. In the following description of the present invention, when it is determined that a detailed description of a related well-known configuration or function may make the gist of the present invention obscure, the detailed description will be omitted.

The accompanying drawings and the embodiments are intended to facilitate understanding of the present invention with a focus on specific functions, operations, and configurations. In order to facilitate the above understanding, the accompanying drawings and the embodiments may be partially exaggerated or reduced in size. However, the spirit of the present invention should not be limited by the exaggerated or reduced specifications or indices of the limited embodiments.

Meanwhile, the contents of Korean Patent No. 10-1692169 (issued on Dec. 29, 2015), which is the above-described related art document, may be referred to in order to supplement the configuration of the present invention without departing from the scope of the present invention. It will be apparent to those skilled in the art that configurations common to the related art and the present invention may be applied to and included in the present invention.

Figure 1:
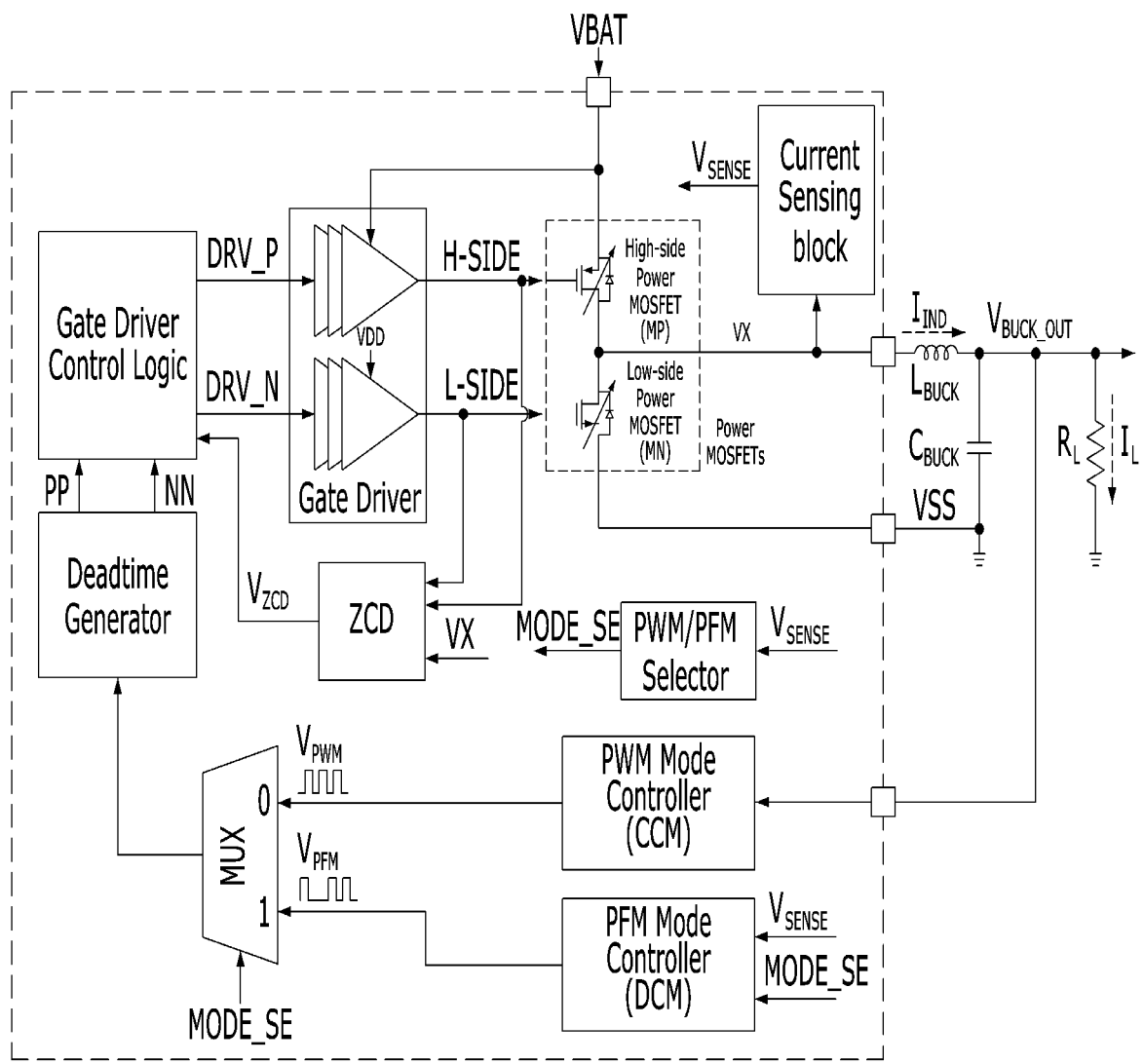
FIG. 1 is a diagram showing a conventional common DC-DC converter.
Figure 2:
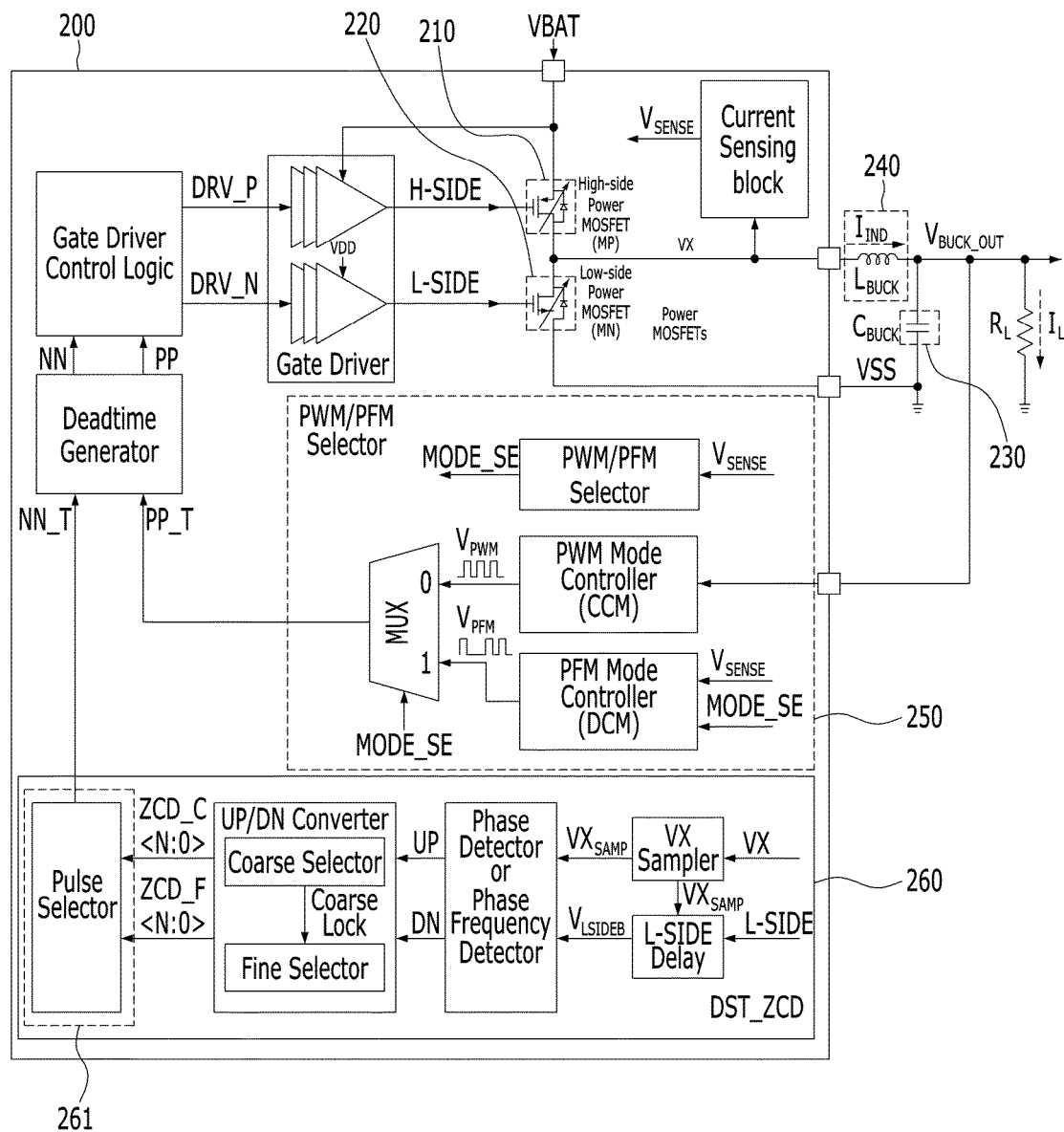
FIG. 2 is a view showing a low-power DC-DC converter capable of preventing reverse current with digital operations according to the present invention.

FIG. 2 is a view showing a low-power DC-DC converter 200 capable of preventing reverse current with digital operations according to the present invention.

Referring to FIG. 2, the low-power DC-DC converter 200 capable of preventing reverse current with digital operations may include a first switch 210, a second switch 220, a capacitor $C_{BUCK}$ 230, an inductor $L_{BUCK}$ 240, a switching generation unit PWM/PFM Selector 250, and a switching control circuit DST-ZCD 260.

The DC-DC converter 200 of FIG. 2 employs a feedback method of automatically adjusting the output voltages of the first switch 210 and the second switch 220 to desired levels according to the duty intervals or frequency changes of a first switching signal H-SIDE and a second switching signal L-SIDE.

The first switch 210 is turned on for a first switching interval in each cycle by a first switching signal H-SIDE, and is turned off for the remaining interval of the switching cycle. For the turned-on interval, energy is supplied from an input power source VBAT to the inductor $L_{BUCK}$ 240. In this case, the first switching signal H-SIDE is turned on after a second switching signal L-SIDE has been blocked.

The second switch 220 is turned on for a second switching interval in each cycle by a second switch signal L-SIDE, and is turned off for the remaining interval of the switching cycle. For the turned-on interval, the inductor $L_{BUCK}$ 240 is electrically connected to a ground terminal VSS, and an electric path that passes through the capacitor $C_{BUCK}$ 230, the inductor $L_{BUCK}$ 240, and the ground terminal VSS may be constructed.

In this case, the second switching signal L-SIDE is turned on after the first switching signal H-SIDE has been blocked.

Accordingly, each switching cycle may be divided into a first switching interval for which the first switching signal H-SIDE is turned on and the second switching signal L-SIDE is blocked, a second switching interval for which the first switching signal H-SIDE is blocked and the second switching signal L-SIDE is turned on, and a common blocking interval for which the first and second switching signals H-SIDE and L-SIDE are all blocked.

In general, a buck DC-DC converter repeats the operation of accumulating energy from an input power source in the inductor $L_{BUCK}$ 240 for the first switching interval of each switching cycle and transferring energy from the inductor $L_{BUCK}$ 240 to the capacitor $C_{BUCK}$ 230 in the form of current while blocking the input power source for the second switching interval thereof.

When the power of a load is low, the amount of energy with which the capacitor $C_{BUCK}$ 230 needs to be charged is small for each switching cycle, and thus a high current cannot or should not flow to the inductor $L_{BUCK}$ 240. Accordingly, the power efficiency of the DC-DC converter may be increased by setting the inductor $L_{BUCK}$ 240 in a state (a zero current state) in which no current is allowed to flow to the capacitor $C_{BUCK}$ 230 for an interval of a switching cycle.

This operation is referred to as a discontinuous current mode, and the DC-DC converter repeats a three-step operation in a discontinuous current mode.

A first step is a step at which in the first switching interval, the inductor $L_{BUCK}$ 240 is connected to the input power source, and thus current $I_{IND}$ flows to the inductor $L_{BUCK}$ 240 and energy is stored in the inductor $L_{BUCK}$ 240. At this step, a current path extends from the input power source through the inductor $L_{BUCK}$ 240 to the capacitor $C_{BUCK}$ 230 and the load $R_{BUCK}$, and the energy storage of the inductor $L_{BUCK}$ 240, the charging of the capacitor $C_{BUCK}$ 230 and the supply of power to the load $R_{LUCK}$ are performed by the input power source.

A second step is a step at which in the second switching interval, the inductor $L_{BUCK}$ 240 is disconnected from the input power source and is connected to a ground electric potential instead. At this step, a current path includes the ground electric potential, the inductor $L_{BUCK}$ 240, the capacitor $C_{BUCK}$ 230, and the load $R_{BUCK}$, and the charging of the capacitor $C_{BUCK}$ 230 and the supply of power to a load RL are performed using only energy stored in the inductor $L_{BUCK}$ 240.

A third step is a step at which in the common blocking interval, the inductor $L_{BUCK}$ 240 is disconnected from not only the input power source but also the ground electric potential, a current path includes only the capacitor $C_{BUCK}$ 230 and the load $R_{BUCK}$ and the supply of power the load $R_{BUCK}$ is performed using only energy stored in the capacitor $C_{BUCK}$ 230. At this step, current does not flow to the inductor $L_{BUCK}$ 240 and this state is referred to as a zero current state. This three-step repetitive operation mode is referred to as a discontinuous current mode.

The switching generation unit PWM/PFM Selector 250 selects a pulse width modulation (PWM) mode or a pulse frequency modulation (PFM) mode according to the load $R_L$, and operates the mode.

In the PFM mode, a switching cycle is operated in such a manner that the switching cycle is increased in inverse proportion to the power consumption of the load $R_L$ and is decreased in proportion to the power consumption of the load RL.

In the PWM method, a switching cycle is determined by the cycle of a predetermined signal, such as a triangular wave or sawtooth wave signal or the like inside a PWM mode controller. In the same manner, the turned-on duty of a signal cycle is adjusted according to the power consumption of the load $R_L$ and then operation is performed.

In general, the PWM mode is operated in a continuous current mode, and the PFM mode is operated in a discontinuous current mode.

In a discontinuous current mode DC-DC converter, the switching generation unit 250 determines the starting point of the common blocking interval, which is the end point of the second switching interval, by detecting the voltage level of a VX node.

The conventional discontinuous current mode DC-DC converter compares the voltage level of the VX node with a reference voltage by using a high-performance comparator for each switching cycle and, when the comparator detects the fact that the voltage level of the VX node is at a zero current point, immediately deactivates the second switching interval and starts the common blocking interval.

In contrast, in the discontinuous current mode according to embodiments of the present invention, the DC-DC converter 200 determines the point at which the second switching signal L-SIDE is turned on and the length of the second switching interval in a current switching cycle based on the state of the voltage level of the VX node. Accordingly, some switching cycles are required until the length of the second switching signal L-SIDE is stabilized. There is no need for a high-performance comparator that continuously consumes power, and thus overall power consumption is reduced, thus influencing the improvement of efficiency. In systems such as the Internet of Things, etc., when supply power is low, the DC-DC converter 200 helps to increase efficiency.

The switching control circuit DST-ZCD 260 operates with digital operations, and prevents the reverse current of the low-power DC-DC converter 200.

In other words, the switching control circuit 260 may generate a first sample signal $VX_{SAMP}$ by sampling the voltage level of the VX node, i.e., a first node at which the first switch and the second switch are connected to the inductor, by using a digital sampler circuit (a VX sampler), and may determine a pulse width adjustment adapted to adjust at least one of the length of a second switching interval to be applied to a subsequent switching cycle and the length of the common blocking interval for which the first switch 210 and the second switch 220 are all turned off responding to the first sample signal $VX_{SAMP}$ in time domain.

Figure 3:
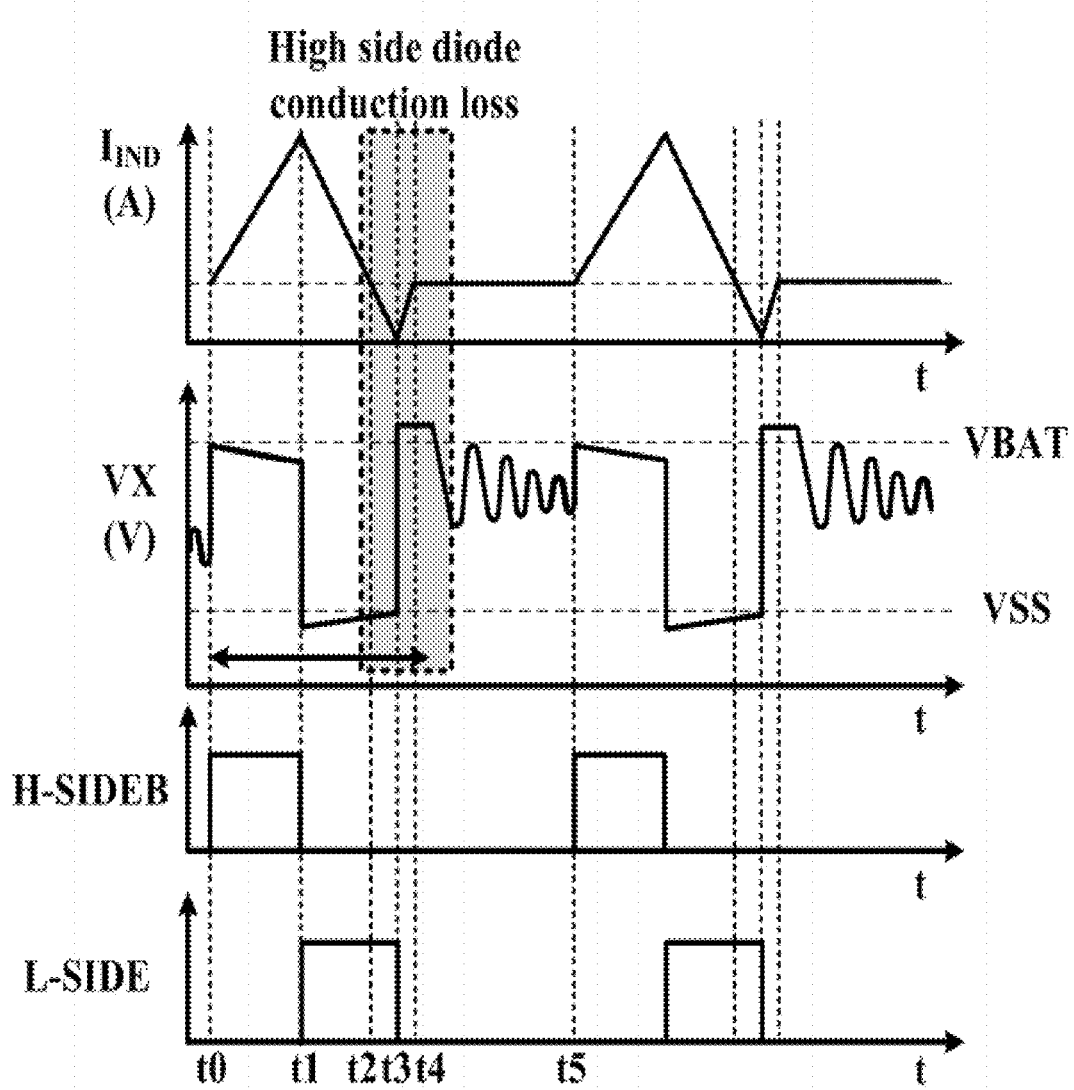
FIGS. 3 to 5 are timing diagrams illustrating the waveforms and timings of voltage and current signals for preventing reverse current in a discontinuous power mode DC-DC converter according to an embodiment of the present invention.
Figure 4:
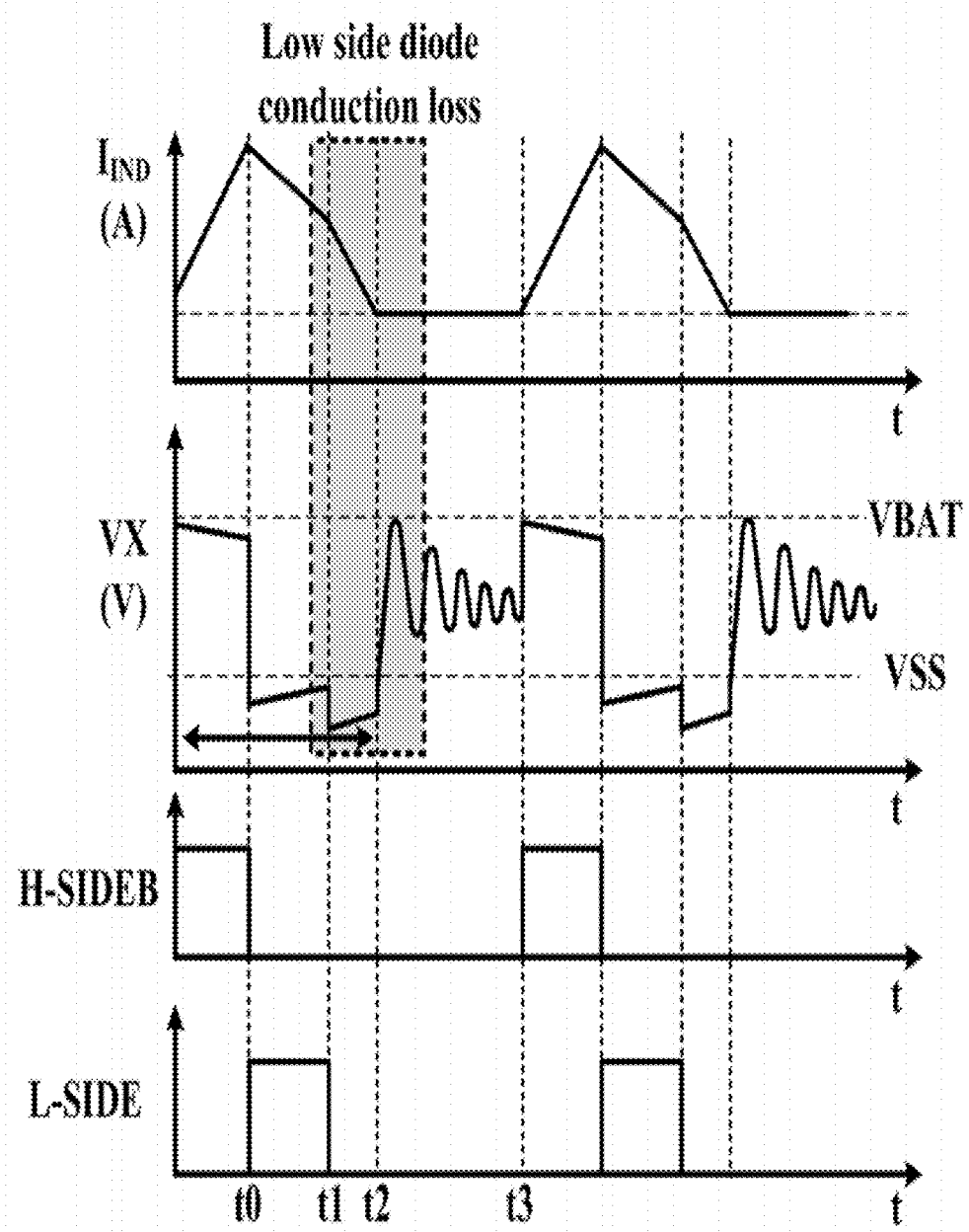
Figure 5:
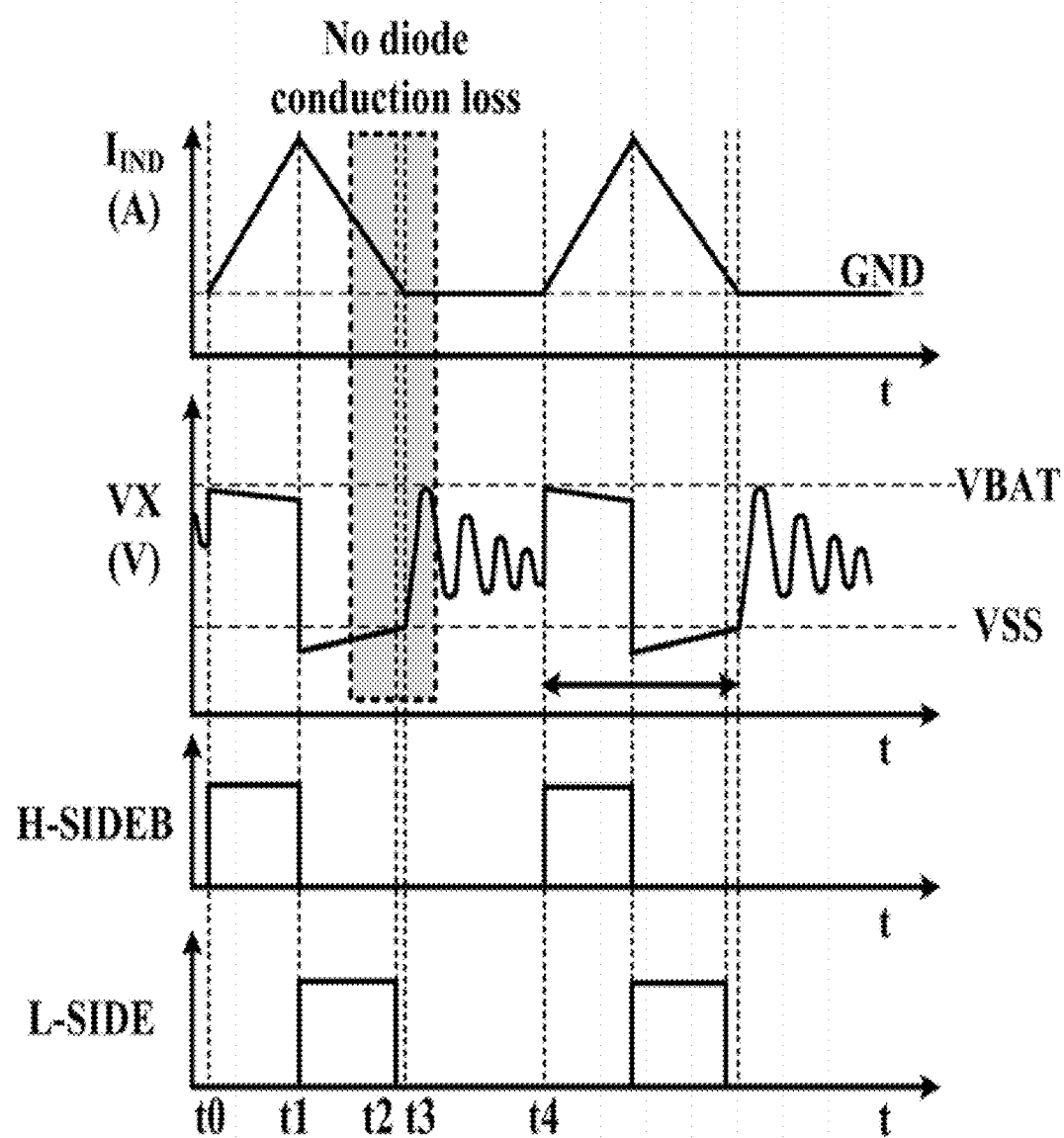

In this case, the digital sampler circuit may determine the High or Low of an output signal based on a specific threshold voltage in order to output stable, accurate pulses while taking into account a ringing phenomenon that may occur at the VX node. In this case, the specific threshold voltage may include a single threshold voltage or a plurality of threshold voltages. For example, the digital sampler circuit may have 0 V and VDD as a plurality of threshold voltages, in which case 0 V may have first priority and VDD may have second priority. Referring to FIGS. 3 to 5 to be described in greater detail later, when the voltage of the VX node is lower than 0 V, the digital sampler circuit generates a first sample signal as an output signal, i.e., the result of the sampling, so that the first sample signal has the value "Low." In contrast, when the voltage of the VX node is equal to or higher than 0 V, the digital sampler circuit generates a first sample signal as an output signal, i.e., the result of the sampling, so that the first sample signal has the value "High." When the voltage of the VX node changes from the state of being lower than 0 V and exceeds 0 V, the digital sampler circuit changes the first sample signal from Low to High. In other words, a sample result may be viewed as being changed based on 0 V. Thereafter, even when the voltage of the VX node rings within a range above 0 V, the digital sampler circuit may keep the first sample signal High. The plurality of threshold voltages may be determined in advance by taking into account the amplitude over which the voltage of the VX node transiently rings in time domain.

Furthermore, the digital sampler circuit may generate the first sample signal $VX_{SAMP}$ based on the voltage level of the VX node and the sampling cycle (or sampling clock) of the digital sampler regardless or independent of the first switching signal H-SIDE and/or the second switching signal L-SIDE.

The first switching signal H-SIDE and/or the second switching signal L-SIDE do not directly influence the generation of the first sample signal $VX_{SAMP}$. Accordingly, the first sample signal $VX_{SAMP}$ may provide information about changes over time in the voltage of the VX node to the circuits (a phase detector or phase frequency detector) of a subsequent stage without loss. The difference between an equilibrium state in which reverse current is blocked and a current state may be quantified by the phase difference between the first sample signal $VX_{SAMP}$ and the second switching signal L-SIDE (or delay signals derived based on the second switching signal).

The switching control circuit 260 may determine the pulse width adjustment based on the quantified level of the phase difference between the first sample signal $VX_{SAMP}$ and the second switching signal L-SIDE.

The switching control circuit 260 may generate a plurality of control signals (UP/DN signals) based on the quantified level of the phase difference between the first sample signal $VX_{SAMP}$ and the second switching signal L-SIDE. In this case, the plurality of control signals may have a pulse width into which the quantified level of the phase difference between the first sample signal $VX_{SAMP}$ and the second switching signal L-SIDE has been incorporated. In other words, the pulse width of the plurality of control signals (UP/DN signals) may increase in proportion to the phase difference between the first sample signal $VX_{SAMP}$ and the second switching signal L-SIDE, and may decrease proportion to the phase difference between the first sample signal $VX_{SAMP}$ and the second switching signal L-SIDE.

In this case, in FIG. 2, it may be possible to compare the phase of a $V_{LSIDEB}$ signal (a second switching delay signal) the polarity of which has been inverted while undergoing an L-SIDE delay and the phase of the first sample signal $VX_{SAMP}$ for the VX node without directly comparing the phase of the first sample signal $VX_{SAMP}$ for the VX node, i.e., the first node, and the phase of the second switching signal L-SIDE. However, this is merely an embodiment of the present invention, and the spirit of the present invention is not limited thereto. In an embodiment, even when the phase of the first sample signal $VX_{SAMP}$ for the VX node and the phase of the second switching signal L-SIDE are compared with each other, the intended object of the present invention may be achieved.

More specifically, a second switching delay signal $V_{LSIDEB}$ (generated in such a manner that the second switching signal L-SIDE is delayed and inverted) may be selected as a signal to be compared with the phase of the first sample signal $VX_{SAMP}$ by means of the switching control circuit 260 by taking into account the parasitic capacitance of the second switch 220. In other words, the switching control circuit 260 may generate the plurality of control signals (UP/DN signals) based on the difference between the phase of the first sample signal $VX_{SAMP}$ for the VX node and the phase of the second switching delay signal $V_{LSIDEB}$. Furthermore, although the second switching delay signal $V_{LSIDEB}$ may have polarity opposite to that of the second switching signal L-SIDE, this is a configuration derived during the process of selecting an embodiment, and the spirit of the present invention is not limited thereto.

The switching control circuit 260 may generate a first control signal (an UP signal) having a pulse width activated by the difference between the phase of the second switching delay signal $V_{LSIDEB}$ and the phase of the first sample signal $VX_{SAMP}$ when the phase of the second switching delay signal $V_{LSIDEB}$ leads the phase of the first sample signal $VX_{SAMP}$, and may generate a second control signal (a DN signal) having a pulse width activated by the difference between the phase of the first sample signal $VX_{SAMP}$ and the phase of the second switching delay signal $V_{LSIDEB}$ when the phase of the first sample signal $VX_{SAMP}$ leads the phase of the second switching delay signal $V_{LSIDEB}$.

The level of the quantified difference between the phase of the first sample signal $VX_{SAMP}$ and the phase of the second switching signal L-SIDE may be represented by the pulse width of the second control signal (the DN signal) or first control signal (the UP signal) generated based on the difference between the phase of the first sample signal $VX_{SAMP}$ and the phase of the second switching signal L-SIDE (or delay signals derived based on the second switching signal). In this case, the references at which the phases are compared with each other are the rising edge of the first sample signal $VX_{SAMP}$ and the rising/falling edge of the second switching delay signal $V_{LSIDEB}$ exhibiting the closest change. In FIGS. 3 to 7 shown to help to understand the present invention, the second switching signal L-SIDE is inverted and forms the second switching delay signal $V_{LSIDEB}$, and thus a phase difference is obtained by comparing the rising edge of the first sample signal $VX_{SAMP}$ and the rising edge of the second switching delay signal $V_{LSIDEB}$. This difference may vary depending on the topology and circuit configuration of a DC-DC converter circuit, which should not be interpreted as having a concept that limits the scope of the present invention. In an embodiment of the present invention, the rising edge of the first sample signal $VX_{SAMP}$ is an event that is caused by the event in which the second switching signal L-SIDE is deactivated, and the rising edge of the second switching delay signal $V_{LSIDEB}$, which is a comparison target signal for comparison with the rising edge of the first sample signal $VX_{SAMP}$ in order to obtain the phase difference, is also an event that is caused by the event in which the second switching signal L-SIDE is deactivated. In other words, it is presupposed that two signal events for the comparison of phases are events that are caused by the same event (in this case, the event in which the second switching signal L-SIDE is deactivated).

In this case, the switching control circuit 260 may increase the length of the second switching interval of a subsequent switching cycle by an pulse width adjustment when the first control signal (the UP signal) is generated, and may decrease the length of the second switching interval of a subsequent switching cycle by the pulse width adjustment when the second control signal (the DN signal) is generated. The switching control circuit 260 may generate a digitized reference pulse selection control signal, i.e., ZCD_C or ZCD_F, by using a plurality of control signals, i.e., the UP signal and the DN signal. The pulse selector 261 of the switching control circuit 260 may select any one of a plurality of reference pulses by using ZCD_C or ZCD_F, and may generate an NN_T signal, which is a reference signal for the timing of the second switching signal L-SIDE.

The DC-DC converter 200 may determine the time at which the second switching signal L-SIDE is turned on, i.e., the length of the second switching interval, based on the state of the voltage level of the first node (the VX node) in a current switching cycle. Although some switching cycles are required until the length of the second switching signal L-SIDE is stabilized, overall power consumption may be reduced and thus efficiency may be improved because the conventional high-performance comparator that continuously consumes power is not required.

Meanwhile, the width of the pulse width adjustment adapted to adjust the second switching interval or common blocking interval may be set to a larger value as the pulse width of the second control signal (the DN signal) or first control signal (the UP signal) generated based on the phase difference between the first sample signal $VX_{SAMP}$ and the second switching signal L-SIDE/second switching delay signal $V_{LSIDEB}$ becomes longer, and may be set to a smaller value as the pulse width of the DN signal or UP signal becomes shorter.

The switching control circuit 260 may set the pulse width adjustment to a first adjustment time width (a coarse adjustment time width) when the quantified level of the phase difference between the first sample signal $VX_{SAMP}$ and the second switching signal L-SIDE exceeds a threshold value, and may set the pulse width adjustment to a second adjustment time width (a fine adjustment time width) shorter than the first adjustment time width (the coarse adjustment time width) when the quantified level of the phase difference between the first sample signal $VX_{SAMP}$ and the second switching signal L-SIDE is equal to or lower than the threshold value.

The switching control circuit 260 may adjust the operation of the second switching signal L-SIDE by using the coarse adjustment time width so that the phase of the first sample signal $VX_{SAMP}$ and the phase of the second switching delay signal $V_{LSIDEB}$ coincide with each other within the error range of the digital sampler circuit (the VX sampler) when the pulse width of the first control signal (the UP signal) or second control signal (DN signal) exceeds a threshold value, and may adjust the operation of the second switching signal L-SIDE by using the fine adjustment time width so that the phase of the first sample signal $VX_{SAMP}$ and the phase of the second switching delay signal $V_{LSIDEB}$ coincide with each other within the error range of the digital sampler circuit (the VX sampler) when the pulse width of the UP signal or DN signal is equal to or shorter than the threshold value.

Figure 9:
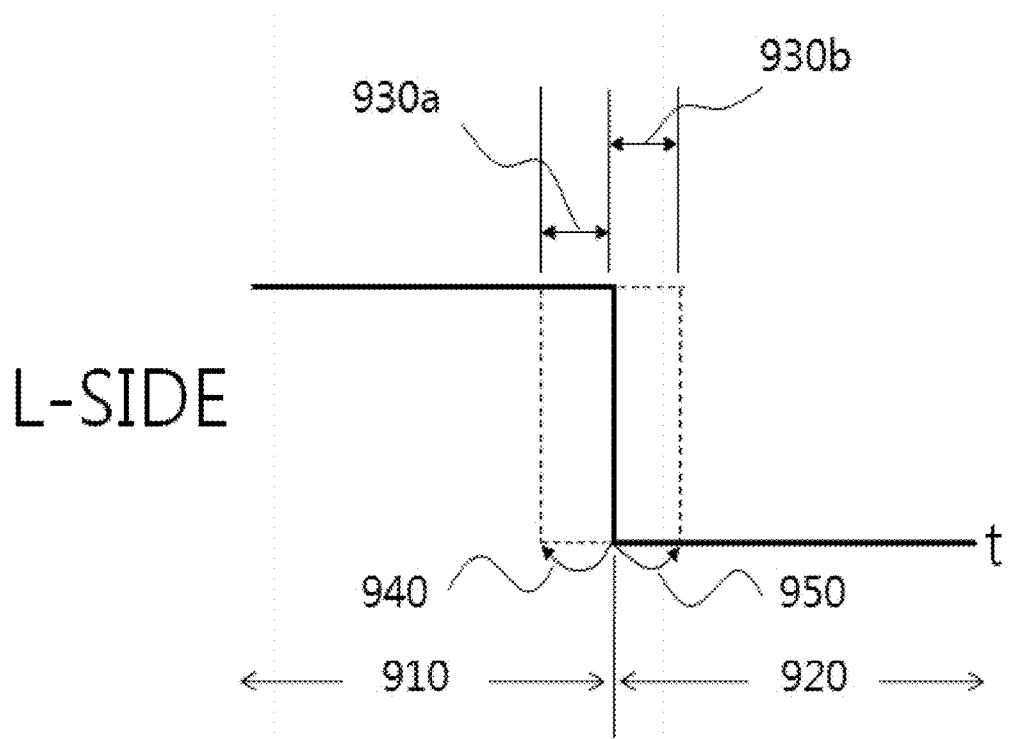
FIG. 9 is a timing diagram illustrating an operation of adjusting the length of a second switching interval or common blocking interval in a low-power DC-DC converter according to an embodiment of the present invention and pulse width adjustments.

FIG. 9 is a timing diagram showing an operation of adjusting the length of a second switching interval or common blocking interval in a low-power DC-DC converter according to an embodiment of the present invention.

Referring to FIG. 9, in a second switching signal L-SIDE, the length of a second switching interval 910 is made to be longer than the length of an original second switching interval 910 by an pulse width adjustment 930b by means of the operation 950 of the first control signal, i.e., the UP signal, and, in the second switching signal L-SIDE, the length of the second switching interval 910 is made to be shorter than the length of the original second switching interval 910 by an pulse width adjustment 930a by means of the operation 940 of the second control signal, i.e., the DN signal.

Accordingly, the length of a common blocking interval 920 may vary depending on whether an operation control mode is a PWM mode or a PFM mode.

Figure 10:
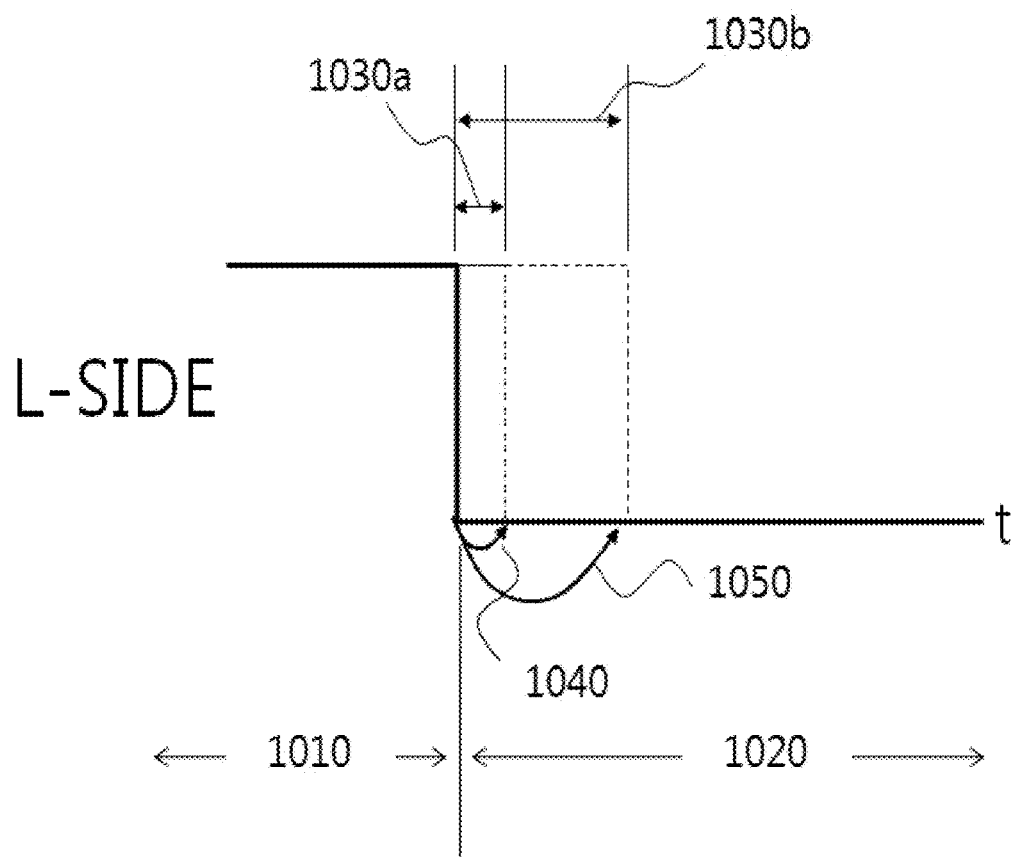
FIG. 10 is a timing diagram illustrating coarse and fine adjustment mode operations of increasing the length of a second switching interval in a low-power DC-DC converter according to an embodiment of the present invention and pulse width adjustments.

FIG. 10 is a timing diagram showing coarse and fine adjustment mode operations of increasing the length of a second switching interval 1010 in a low-power DC-DC converter according to an embodiment of the present invention.

Referring to FIG. 10, when a first control signal, i.e., an UP signal, is generated, a second switching signal L-SIDE may have the length of a second switching interval 1010 that is longer than the length of an original second switching interval 1010 by an pulse width adjustment. In this case, the switching control circuit 260 may set the pulse width adjustment to a first adjustment time width 1030b (a coarse adjustment time width) when the quantified level of the phase difference between a first sample signal $VX_{SAMP}$ and a second switching signal L-SIDE exceeds a threshold value, and may set the pulse width adjustment to a second adjustment time width 1030a (a fine adjustment time width) shorter than the first adjustment time width 1030b (the coarse adjustment time width) when the quantified level of the phase difference between the first sample signal $VX_{SAMP}$ and the second switching signal L-SIDE is equal to or lower than the threshold value. In a coarse adjustment mode operation 1050, the second switching signal L-SIDE may have the length of the second switching interval 1010 longer than an original length by the pulse width adjustment 1030b, and in a fine adjustment mode operation 1040, the second switching signal L-SIDE may have the length of the second switching interval 1010 longer than the original length by the pulse width adjustment 1030a. Although the case where the UP signal is generated and the length of the second switching signal L-SIDE is increased is shown in FIG. 10, the length of the pulse width adjustment may be adjusted by applying the coarse and fine modes to a case where a DN signal is generated and the length of the second switching signal L-SIDE is decreased in a manner similar to that of FIG. 10.

FIGS. 3 to 5 are timing diagrams illustrating the waveforms and timings of voltage and current signals regarding the occurrence of reverse current attributable to a second switching interval in the DC-DC converter.

FIG. 3 illustrates the waveforms of inductor current $I_{IND}$ and the voltage of the VX node in a case where the inductor current $I_{IND}$ reaches a zero current and then a second switch MN 220 is turned off.

When a first switching interval starts at t0 and a first switching signal MP is activated, an inductor $L_{BUCK}$ is connected to a power source VBAT and also inductor current $I_{IND}$ rises linearly and stores energy in the inductor $L_{BUCK}$ during the first switching interval.

Since a first switch MP 210 is turned on, the voltage of a VX node, i.e., a first node, rises to the voltage level of a power source.

The first switching interval is turned off at t1, and a second switching signal L-SIDE is turned on. During a second switching interval, the inductor $L_{BUCK}$ is connected to a ground VSS, and the inductor current $I_{IND}$ decreases gradually and transfers energy stored in the inductor $L_{BUCK}$ to a capacitor $C_{BUCK}$.

Since the second switch MN 220 is turned on, the voltage of the VX node falls to a level slightly lower than the voltage level of the ground VSS, and then rises gradually as the inductor current $I_{IND}$ decreases.

The second switching signal L-SIDE is maintained in an activated state at t2 even when the energy stored in the inductor $L_{BUCK}$ is consumed and the inductor current $I_{IND}$ passes through a zero current. Since the second switch MN 220 is turned on, a current path including the ground VSS, the second switch MN 220, the inductor $L_{BUCK}$, and the capacitor $C_{BUCK}$ is electrically connected, and the inductor $L_{BUCK}$ allows the inductor current $I_{IND}$ to flow from the capacitor $C_{BUCK}$ in a reverse direction.

Although the second switching signal L-SIDE is deactivated at t3 and the second switch MN 220 is turned off, a reverse current path passing through the inductor L is maintained when the parasitic diode of the first switching is turned on.

The voltage of the VX node is electrically connected to the ground VSS through the parasitic diode of the first switching, and is made to be higher than the voltage level of the ground VSS by the forward bias voltage of the parasitic diode of the first switching. Since the energy stored in the capacitor $C_{BUCK}$ is consumed by a load $R_L$ and the reverse inductor current $I_{IND}$, the energy stored in the capacitor $C_{BUCK}$ is rapidly decreased. Furthermore, since power is additionally consumed by the equivalent resistance of the diode of the first switching parasitic, the reverse inductor current $I_{IND}$ is rapidly decreased.

The voltage of the VX node is kept higher than the voltage of the power source VBAT until the inductor current $I_{IND}$ reaches a zero current.

When the inductor current $I_{IND}$ reaches a zero current at t4, the parasitic diode of the first switching is turned off, and first and second switches MP and MN 220 are all turned off, and thus the voltage of the VX node enters an open state. Thereafter, when a first switching interval starts at t5, the interval is repeated.

FIG. 4 illustrates the waveforms of the inductor current $I_{IND}$ and the voltage of the VX node when the second switch MN 220 is turned off before the inductor current reaches a zero current.

When a first switching interval starts at t0 and a first switching signal H-SIDE is turned on, the inductor current $I_{IND}$ rises linearly and stores energy in the inductor $L_{BUCK}$ during the first switching interval. Since the first switch MP 210 is turned on, the voltage of the VX node rises to the voltage of the power source.

The first switching interval ends, and a second switching signal L-SIDE is turned on. During a second switching interval, the inductor $L_{BUCK}$ is connected to the ground VSS, and the inductor current $I_{IND}$ decreases linearly and transfers the energy stored in the inductor $L_{BUCK}$ to the capacitor $C_{BUCK}$. Since the second switch MN 220 is turned on, the voltage of the VX node falls to a level slightly lower than the voltage level of the ground, and rises gradually as the inductor current $I_{IND}$ decreases.

The second switching interval ends at t2 before the inductor $L_{BUCK}$ enters a zero current state. Although the second switch MN 220 is turned off, a current path for the inductor $L_{BUCK}$ is maintained via the parasitic diode of the second switch 220.

The voltage of the VX node is kept lower than the voltage level of the ground VSS until the energy stored in the inductor $L_{BUCK}$ is the inductor current $I_{IND}$ reaches a zero current.

When the inductor current $I_{IND}$ reaches a zero current at t3, the parasitic diode of the second switching is turned off. Since the first and second switches MP and MN 220 are all turned off, the voltage of the VX node enters an open state. Thereafter, when a first switching interval starts at t4, the interval is repeated.

FIG. 5 illustrates the waveforms of the inductor current $I_{IND}$ and the voltage of the VX node in a case where a second switching interval ends and a common blocking interval starts ideally and exactly in accordance with a zero current state.

When a first switching interval starts at t0, the inductor $L_{BUCK}$ is connected to the power source VBAT, and the inductor current $I_{IND}$ rises and stores energy in the inductor $L_{BUCK}$.

Since the first switch MP 210 is turned on, the voltage of the VX node rises to the voltage level of the power source VBAT. The voltage of the VX node decreases due to the equivalent resistance of the first switch MP 210 as the inductor current $I_{IND}$ increases.

When the first switching interval is turned off at t1, the second switching signal L-SIDE is turned on. During a second switching interval, the inductor $L_{BUCK}$ is connected to the ground VSS, and the inductor current $I_{IND}$ decreases and transfers the energy stored in the inductor $L_{BUCK}$ to the capacitor $C_{BUCK}$.

Since the second switch MN 220 is turned on, the voltage of the VX node falls to the voltage of the ground VSS. The voltage of the VX node is slightly lower than the voltage of the ground VSS due to the equivalent resistance of the second switch MN 220, and the width thereof decreases as the inductor current $I_{IND}$ decreases.

When the overall energy stored in the inductor $L_{BUCK}$ is consumed and the inductor current $I_{IND}$ reaches a zero current at t3, the second switching signal L-SIDE is turned off. Since the first and second switches MP and MN 220 are all turned off, the voltage of the VX node is in an open state.

When the voltage of the VX node enters an open state, ringing occurs due to the level of the voltage stored in the capacitor $C_{BUCK}$ and the LC value of the capacitor $C_{BUCK}$ and the inductor $L_{BUCK}$.

Thereafter, when a first switching interval starts at t4, the interval is repeated.

In FIG. 5, the voltage of the VX node is converted into a $VX_{SAMP}$ signal via the VX sampler provided in a DST-ZCD block, and is then output.

As described above, one of the functions of the VX sampler is to output accurate pulses while preventing erroneous waveforms attributable to a ringing phenomenon that may occur at the VX node.

The second switching signal L-SIDE is output as the $V_{LSIDEB}$ signal, i.e., a delayed and inverted signal, via the L-SIDE delay. The L-SIDE delay receives the L-SIDE signal and the $VX_{SAMP}$ signal, senses the $VX_{SAMP}$ signal (e.g., via a circuit such as a D-FF, or the like), compensates for a parasitic component, propagation delay, etc. in power MOSFETs, and outputs the $V_{LSIDEB}$ signal, which is an L-SIDE-delayed and inverted signal.

The output signal is output as the UP/DN signal via a phase detector or phase frequency detector in order to detect an accurate reverse current point. The output UP/DN signal coarsely searches for a zero current point through fast tracking via a coarse selector (a pulse converter).

The coarse selector circuit may be designed in various forms. For example, the coarse selector circuit may be configured to detect the duty ratio or pulse width of UP/DN and to change ZCD_C<N:0> based on the duty ratio or pulse width, and may be configured to count an UP/DN value obtained by digitizing the duty ratio or pulse width of UP/DN, to determine ZCD_C<N:0>, and to allow a pulse selector to determine the MSB. Alternatively, the coarse selector circuit may be designed using a coarse-tuning method. The coarse selector circuit operates only up to N (N is a natural number, and a variable) of the output value "ZCD_C<N:0>," outputs a coarse lock signal, and operates such that a coarse selector block is turned off. The reason for this is to operate while decreasing current consumption that may occurs in the coarse selector.

When a first mode (a coarse adjustment mode) has been completed, a coarse lock signal, which is a first mode completion signal indicating that adjustment has been locked at a coarse level, is generated, and then a ZCD_F<N:0> signal is output through the fine selector of an UP/DN converter. The ZCD_F<N:0> bit operates in a rising direction in response to the UP signal, and operates in a falling direction in response to the DN signal.

The determined ZCD_F<N:0> signal is input to the pulse selector, and the second switching interval is determined based on the input ZCD_F<N:0> bit. This refers to the time at which NN_T is turned on. The second switching interval is determined by detecting a reverse current point.

Figure 6:
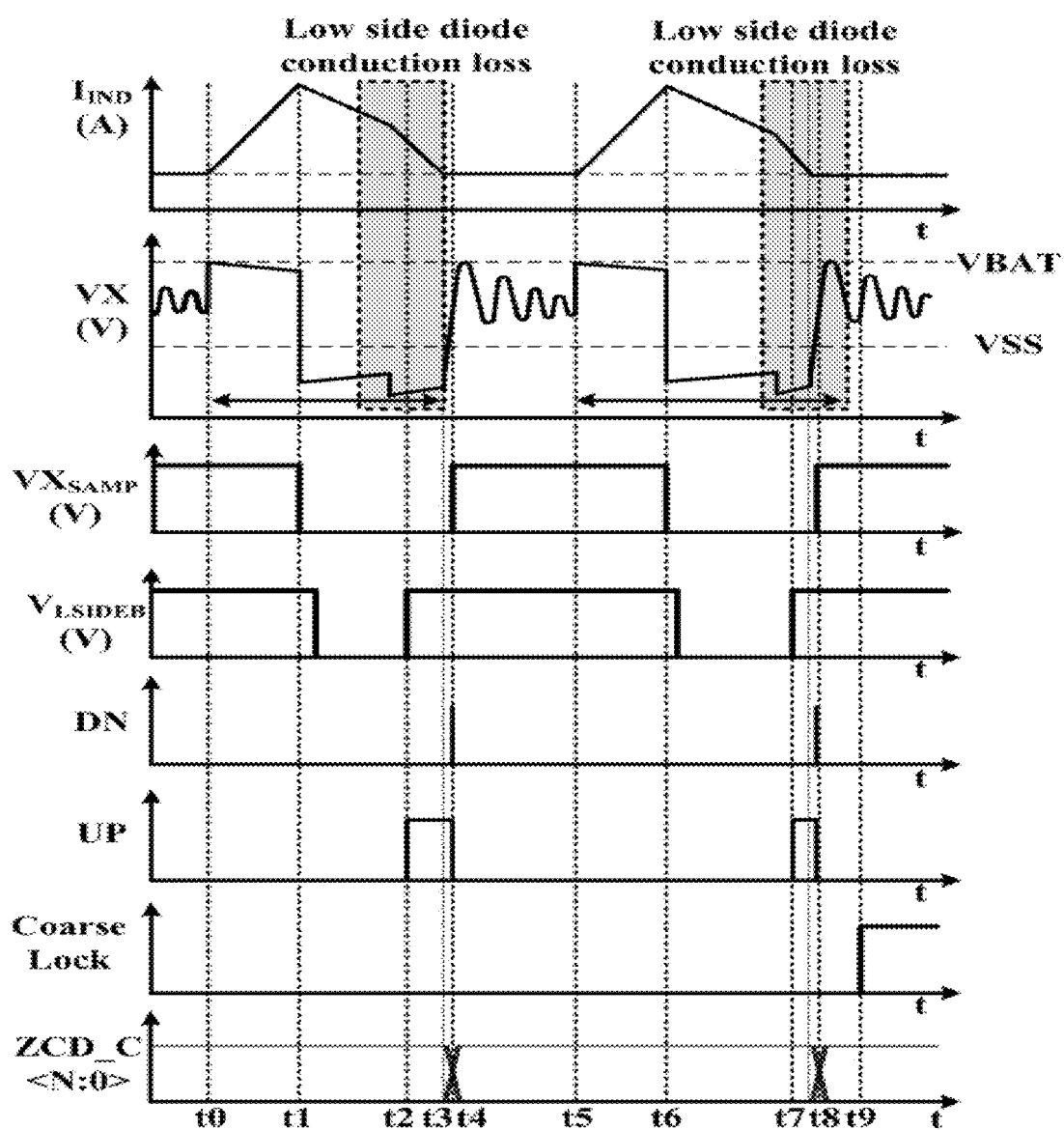
FIG. 6 is a timing diagram illustrating a coarse adjustment operation in the digital control reverse current blocking method of a DC-DC converter according to an embodiment of the present invention.

FIG. 6 is a timing diagram illustrating the waveforms and timings of voltage and current signals in a coarse operation for preventing reverse current through digital control in a DC-DC converter according to an embodiment of the present invention.

The coarse operation for fast tracking operates up to N (a variable), and then stops in response to the output of a coarse lock signal. The ZCD_C<N:0> signal is fixed to a last point value.

In FIG. 6, when a first switching interval starts at t0, a second switching interval ends after a zero current point and a common blocking interval is entered, a first sample signal (a VX$_{SAMP}$ signal) obtained by sampling the voltage of the VX node and a second switching delay signal (a V$_{LSIDEB}$ signal) generated in such a manner that a second switching signal L-SIDE is delayed and inverted are compared with each other. Since the V$_{LSIDEB}$ signal rises earlier than the VX$_{SAMP}$ signal, an UP signal is output from a point t2 at which the V$_{LSIDEB}$ signal rises to a point t3 at which the VX$_{SAMP}$ signal rises, and the UP signal is generated in accordance with reset delay for which a detector is reset. However, this is not incorporated into the ZCD_C<N:0> bit. A reverse current point is detected via the UP signal, and the output UP signal is incorporated into the ZCD_C<N:0> bit at the times at which the VX$_{SAMP}$ signal and the V$_{LSIDEB}$ signal rise. This is incorporated into the second switching signal L-SIDE, and thus the second switching interval is changed. In the timing diagram, a point t4 denotes the (N−1)-th operation of the coarse operation.

In FIG. 6, when a subsequent first switching interval starts at t5, a second switching interval ends before a zero current point, and a common blocking interval is entered, a VX$_{SAMP}$ signal obtained by sampling the voltage of the VX node and a V$_{LSIDEB}$ signal generated in such a manner that a second switching signal L-SIDE is delayed and inverted are compared with each other.

Since the V$_{LSIDEB}$ signal rises earlier than the VX$_{SAMP}$ signal, an UP signal is output from a point t7 at which the V$_{LSIDEB}$ signal rises to a point t8 at which the VX$_{SAMP}$ signal rises, and a DN signal is generated in accordance with reset delay for which a detector is reset. However, it is not incorporated into the ZCD_C<N:0> bit. A reverse current point is detected via the UP signal, and the output UP signal is incorporated into the ZCD_C<N:0> bit at the times at which the VX$_{SAMP}$ signal and the V$_{LSIDEB}$ signal rise. This is incorporated into the second switching signal L-SIDE, and thus the second switching interval is changed. In the timing diagram, the point t8 denotes the N-th operation of the coarse operation, and thus a coarse lock signal is changed to High at a point t9 at which the coarse lock signal is generated.

Figure 7:
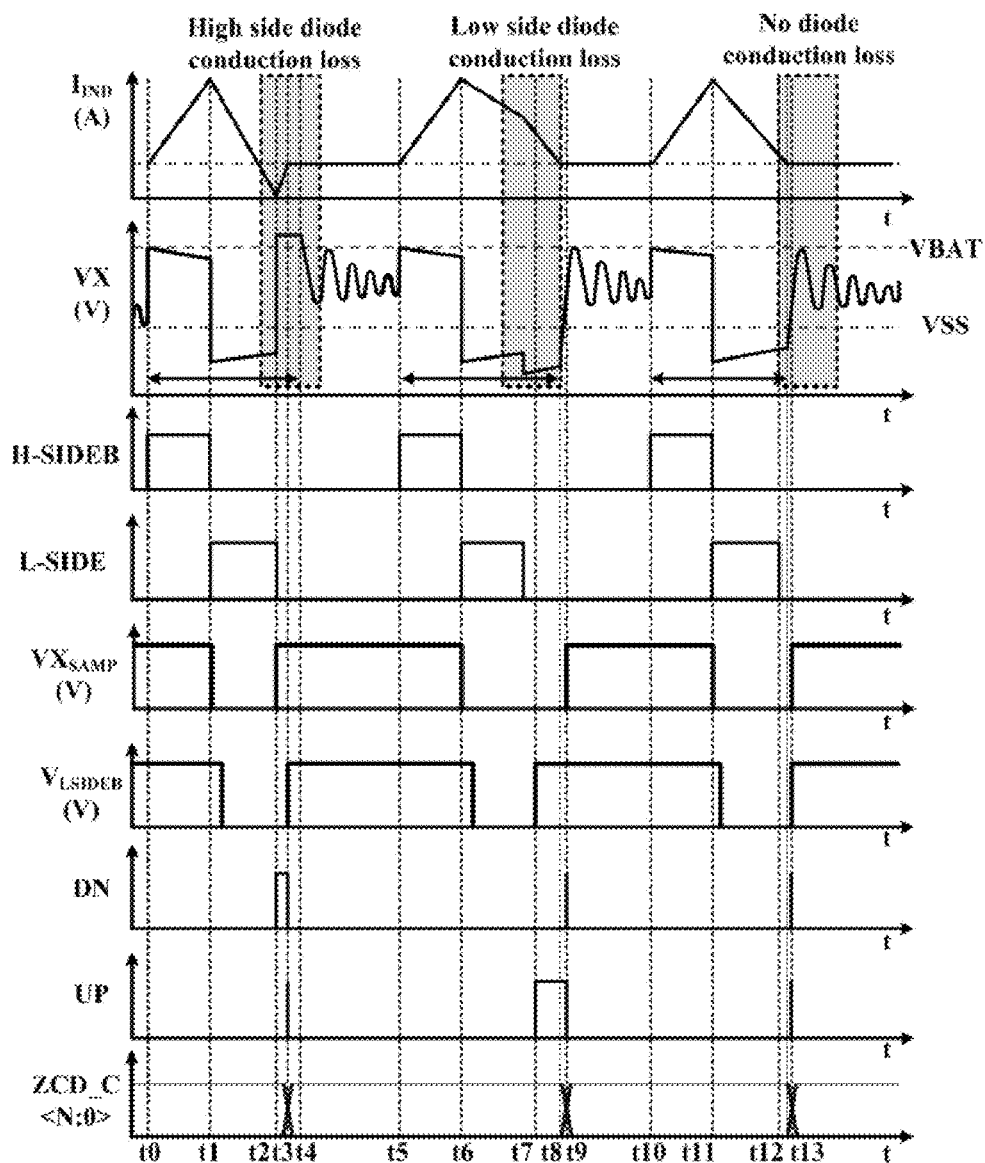
FIG. 7 is a timing diagram illustrating a fine adjustment operation in the digital control reverse current blocking method of a DC-DC converter according to an embodiment of the present invention.

FIG. 7 is a timing diagram illustrating the waveforms and timings of voltage and current signals in a fine operation for preventing reverse current through digital control in a DC-DC converter according to an embodiment of the present invention.

In FIG. 7, a fine operation is performed after a coarse lock signal has been generated, and thus the coarse lock signal is fixed to High and output and ZCD_C<N:0> is fixed and output.

In FIG. 7, when a first switching interval starts at t0, a second switching interval ends after a zero current point and a common blocking interval is entered, a first sample signal (a VX$_{SAMP}$ signal) obtained by sampling the voltage of the VX node and a second switching delay signal (a V$_{LSIDEB}$ signal) generated in such a manner that a second switching signal L-SIDE is delayed and inverted are compared with each other. Since the V$_{LSIDEB}$ signal rises earlier than the VX$_{SAMP}$ signal, an UP signal is output from a point t2 at which the V$_{LSIDEB}$ signal rises to a point t3 at which the VX$_{SAMP}$ signal rises, and the UP signal is generated in accordance with reset delay for which a detector is reset. However, this is not incorporated into the ZCD_F<N:0> bit. A reverse current point is detected via a DN signal, and the output DN signal is incorporated into the ZCD_F<N:0> bit at the times at which the VX$_{SAMP}$ signal and the V$_{LSIDEB}$ signal rise. This is incorporated into the second switching signal L-SIDE, and thus the second switching interval is changed.

In FIG. 7, when a subsequent first switching interval starts at t5, a second switching interval ends before a zero current point, and a common blocking interval is entered, a VX$_{SAMP}$ signal obtained by sampling the voltage of the VX node and a V$_{LSIDEB}$ signal generated in such a manner that a second switching signal L-SIDE is delayed and inverted are compared with each other.

Since the V$_{LSIDEB}$ signal rises earlier than the VX$_{SAMP}$ signal, an UP signal is output from a point t7 at which the V$_{LSIDEB}$ signal rises to a point t8 at which the VX$_{SAMP}$ signal rises, and a DN signal is generated in accordance with reset delay for which a detector is reset. However, it is not incorporated into the ZCD_F<N:0> bit. A reverse current point is detected via the UP signal, and the output UP signal is incorporated into the ZCD_F<N:0> bit at the times at which the VX$_{SAMP}$ signal and the V$_{LSIDEB}$ signal rise. This is incorporated into the second switching signal L-SIDE, and thus the second switching interval is changed.

In FIG. 7, when a subsequent first switching interval starts at t10, an end point of a second switching interval is ideally the same as a zero current point t12, and a common blocking interval is entered, a VX$_{SAMP}$ signal obtained by sampling the voltage of the VX node and a V$_{LSIDEB}$ signal generated in such a manner that a second switching signal L-SIDE is delayed and inverted are compared with each other.

Since the VX$_{SAMP}$ signal and the V$_{LSIDEB}$ signal simultaneously rise ideally, UP/DN signals are generated only in accordance with reset delay at the same rising point t13, which is incorporated into the ZCD_F<N:0> bit so that the ZCD_F<N:0> bit is maintained at an existing value.

Figure 8:
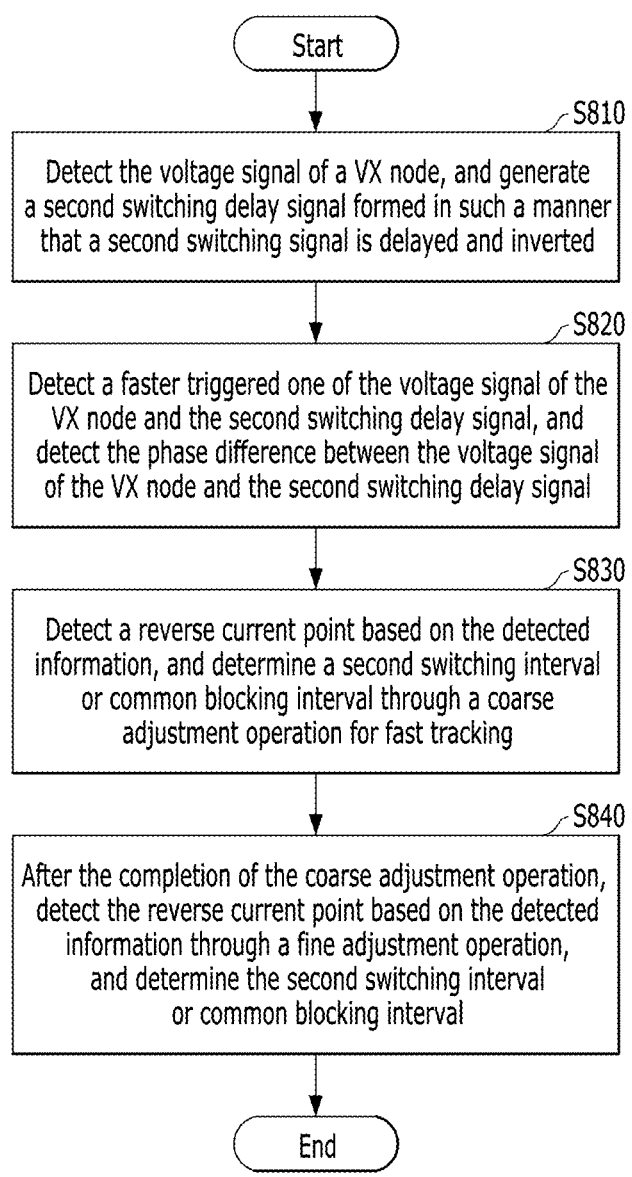
FIG. 8 is a flowchart illustrating a method of controlling a low-power DC-DC converter capable of preventing reverse current with digital operations according to an embodiment of the present invention.

FIG. 8 is a flowchart showing a method of controlling a low-power DC-DC converter 200 capable of preventing reverse current with digital operations according to an embodiment of the present invention.

Referring to FIG. 8, at step S810, the low power DC-DC converter capable of preventing reverse current with digital operations detects the voltage of the first node (the VX node) as a first sample signal (a VX$_{SAMP}$ signal) via a digital sampler circuit (a VX sampler), and a second switching signal L-SIDE is converted into a second switching delay signal $V_{LSIDEB}$ signal, i.e., a signal delayed via the L-SIDE delay and inverted.

In other words, the switching generation unit 260 of the low-power DC-DC converter 200 generates the $VX_{SAMP}$ signal by sampling the voltage level of the VX node where the first switch 210 and the second switch 220 are connected to the inductor $L_{BUCK}$, and generates the second switching signal L-SIDE-based second switching delay signal $V_{LSIDEB}$.

Furthermore, at step S820, a faster one of the generated $VX_{SAMP}$ signal and $V_{LSIDEB}$ signal is detected via a phase detector or phase frequency detector, the phase difference between the two signals is detected, and the detected information UP/DN is output.

In other words, the switching generation unit 260 detects a faster one of the $VX_{SAMP}$ signal and the $V_{LSIDEB}$ signal, detects the phase difference between the $VX_{SAMP}$ signal and the $V_{LSIDEB}$ signal, and outputs UP and DN signals, which are a plurality of control signals indicative of information about the faster one of the $VX_{SAMP}$ signal and the $V_{LSIDEB}$ signal and information about the quantified phase difference between the $VX_{SAMP}$ signal and the $V_{LSIDEB}$ signal.

Thereafter, the detected information UP/DN is applied to the UP/DN converter, a coarse operation for fast tracking is performed N (a variable) times by using ZCD_C<N:0> of the coarse selector, and a second switching interval is determined via the pulse selector at step S830.

Meanwhile, the method may further include a step at which the switching generation unit 260 determines a pulse width adjustment adapted to adjust at least one of the length of a second switching interval and the length of a common blocking interval for which the first switch 210 and the second switch 220 are all turned off to be an pulse width adjustment associated with a coarse operation or pulse width adjustment associated with a fine operation based on the transient response of the $VX_{SAMP}$ signal in time domain.

In this case, the pulse width adjustment may be determined to be the pulse width adjustment associated with a coarse operation or pulse width adjustment associated with a fine operation based on the quantified level of the phase difference between the $VX_{SAMP}$ signal and the second switching signal L-SIDE.

In other words, the method may further include a step at which, when determining the pulse width adjustment to be the pulse width adjustment associated with a coarse operation or pulse width adjustment associated with a fine operation, the switching generation unit 260 determines the pulse width adjustment to be a coarse adjustment time width when the quantified level of the phase difference between the $VX_{SAMP}$ signal and the second switching signal L-SIDE exceeds a threshold value, and determines the pulse width adjustment to be a fine adjustment time width shorter than the coarse adjustment time width when the quantified level of the phase difference between the $VX_{SAMP}$ signal and the second switching signal L-SIDE is equal to or lower than a threshold value.

In this case, the method may further include a step at which the switching control circuit 260 generates a first mode completion signal (a coarse lock signal) indicating that the first mode is completed when the quantified level of the phase difference between the $VX_{SAMP}$ signal and the second switching signal L-SIDE becomes equal to or lower than the threshold value in a coarse adjustment mode in which pulse width adjustment is set to a coarse adjustment time width.

Thereafter, a ZCD_F<N:0> bit is output via a fine selector. When an UP signal is input, the ZCD_F<N:0> bit changes in a rising direction. In contrast, when a DN signal is input, the ZCD_F<N:0> bit changes in a falling direction. The pulse selector determines the second switching interval based on the ZCD_F<N:0> signal at step S840.

The present invention may provide at least one of the following advantages.

The low-power DC-DC converter capable of preventing reverse current with digital operations and the method of operating the same according the present invention may overcome the efficiency reduction disadvantage of the method of detecting a zero current interval by using a conventional high-performance analog comparator, and may prevent reverse current.

The low-power DC-DC converter capable of preventing reverse current with digital operations and the method of operating the same according the present invention may reduce internal power consumption via a digital operation compared to a case using an analog operation, and may accurately prevent reverse current.

The low-power DC-DC converter capable of preventing reverse current with digital operations and the method of operating the same according the present invention may accurately determine a reverse current blocking point even in a digital operation. In particular, although the conventional technology reduces power by digitizing part of a detection operation, the present invention digitizes a detection operation in an initial stage circuit, thereby improving the accuracy of a reverse current blocking point while reducing power.

The low-power DC-DC converter capable of preventing reverse current with digital operations and the method of operating the same according the present invention may prevent reverse current by using PWM or PFM control.

According to the present invention, in order to detect the voltage of the common contact VX node, a sampling signal independent of a first or second switching signal is generated, and thus a change in the VX node in time domain may be transferred to a subsequent stage circuit without change. As a result, in the subsequent stage circuit, an optimized reverse current blocking point may be determined based on the action of the VX node in time domain. A timing when the sampling signal is generated does not affected by the time window defined by the first and/or switching signal.

According to the present invention, a sampling signal generated by detecting the voltage of the common contact VX node is generated in response to a change in the voltage of the VX node. Accordingly, the timing information of the sampling signal in time domain may be used to determine a reverse current blocking point. Therefore, the resolution at which the reverse current blocking point is determined may be time resolution at a level corresponding to the sampling cycle of the sampler circuit for the VX node. The time resolution of a common digital sampler circuit is very high, and the cost and area required to implement the common digital sampler circuit are considerably lower or smaller than an analog comparator circuit. Furthermore, the common digital sampler circuit consumes a considerably smaller amount of power than the analog comparator circuit, and thus provides a higher power reduction effect. In other words, the digital sampler circuit is used for the sampling of the voltage of the VX node, and thus low power, low cost, and a small area may be achieved and high time resolution may be provided. According to the present invention, there may be proposed the low-power DC-DC converter capable of improving the accuracy of a reverse current blocking point based on high time resolution.

According to the present invention, the voltage of the common contact VX node is sampled by means of the digital sampler circuit in an initial stage circuit, and the phase difference between a second switching signal L-SIDE-based delay signal and a VX sample signal is quantified, thereby quantifying the difference between an optimized reverse current blocking point and a present reverse current blocking point.

According to the present invention, the time required to reach an equilibrium point at which the error of a reverse current blocking point is minimized may be reduced. In the present invention, a delay signal may be generated by adding predetermined-level time delay to a second switching signal L-SIDE while taking into account the time required for a second switch to be turned off by the second switching signal L-SIDE. In this case, the generated delay signal initializes a reverse current blocking point so that the reverse current blocking point becomes closer to an optimized reverse current blocking point, thereby reducing the time cost required to reach an optimized reverse current blocking point.

According to the present invention, a second switching signal L-SIDE or the like is controlled in response to the phase difference between a VX sample signal and an L-SIDE delay signal, thereby reducing the time required to reach an optimized reverse current blocking point. Furthermore, as the accuracy of the detection of a phase difference is increased, the accuracy of a reverse current blocking point may be increased. An increase in the detection of a phase difference may be achieved using relatively low cost, relatively low power, and a relatively small area, and is thus highly utilized.

According to the present invention, an operation of controlling a second switching signal L-SIDE or the like in response to the phase difference between a VX sample signal and an L-SIDE delay signal may be performed using a plurality of steps, i.e., coarse and fine steps, thereby improving the accuracy of a reverse current blocking point while reducing the time required to reach an optimized reverse current blocking point.

The present invention was derived from the research conducted as part of the WC300 Technology Development Project sponsored by the Korean Ministry of Trade, Industry and Energy and the Korea Institute for Advancement of Technology [Project Management Number: S2435123; and Project Name: Development of Ultra-Low Power Smart MCU Platform Using 55 nm or Less Class Process and 0.6 V or Less Low-Voltage Circuit Technology for Smart Home and IoT Service].

The advantages of the present invention are not limited to the above-described advantages, and other advantages that are not described above will be clearly understood from the foregoing description by those skilled in the art.

The described embodiments and the accompanying drawings are intended merely to clearly illustrate part of the technical spirit of the present invention. Accordingly, it will be apparent that modifications and specific embodiments that can be easily derived by those skilled in the art within the technical spirit of the present invention fall within the scope of the present invention.

Therefore, the technical spirit of the present invention should not be determined based on only the described embodiments, and the following claims, all equivalents to the claims, and all equivalent modifications should be construed as falling within the scope of the spirit of the present invention.

What is claimed is:

1. A low-power direct current-direct current (DC-DC) converter, comprising:
   a capacitor;
   an inductor electrically connected to the capacitor;
   a first switch configured to:
      be turned on for a first switching interval in response to a first switching signal; and
      supply energy from an input power source to the inductor for the first switching interval;
   a second switch configured to:
      be turned on for a second switching interval, other than the first switching interval, in response to a second switching signal; and
      electrically connect the inductor and a ground terminal to each other for the second switching interval; and
   a switching control circuit configured to generate the first switching signal and the second switching signal,
   wherein the switching control circuit is further configured to generate a first sample signal by sampling a voltage level of a first node where the first switch and the second switch are connected to the inductor by means of a digital sampler circuit, and to determine, responding to the first sample signal in time domain, a width of a pulse width adjustment adapted to adjust at least one of a length of a second switching interval which will be applied to a subsequent switching cycle and a length of a common blocking interval which will be applied to the subsequent switching cycle and for which the first switch and the second switch are all turned off,
   wherein the width of the pulse width adjustment is at least one of a first width difference and a second width difference,
   wherein the first width difference is a difference between a length of a second switching interval applied to a present switching cycle and the length of the second switching interval will be applied to the subsequent switching cycle,
   wherein the second width difference is a difference between a length of a common blocking interval applied to the present switching cycle and the length of the common blocking interval will be applied to the subsequent switching cycle, and
   wherein the switching control circuit is further configured to:
      determine the width of the pulse width adjustment based on the first sample signal in time domain;
      determine the pulse width adjustment to be a first adjustment time width when the quantified level of the phase difference between the first sample signal and the second switching signal exceeds a threshold value;
      determine the pulse width adjustment to be a second adjustment time width shorter than the first adjustment time width when the quantified level of the phase difference between the first sample signal and the second switching signal is equal to or lower than the threshold value; and
      generate a first mode completion signal, indicating that a first mode in which the pulse width adjustment is determined to be the first adjustment time width has been completed and a second mode in which the pulse width adjustment is determined to be the second adjustment time width is asserted, when the quantified level of the phase difference between the first sample signal and the second switching signal becomes equal to or lower than the threshold value in the first mode.

2. The low-power DC-DC converter of claim 1, wherein the switching control circuit is further configured to determine the width of the pulse width adjustment proportional to a phase difference between the first sample signal and the second switching signal.

3. The low-power DC-DC converter of claim 2, wherein the switching control circuit is further configured to generate a plurality of control signals indicating the quantified level of the phase difference based on the phase difference between the first sample signal and the second switching signal.

4. The low-power DC-DC converter of claim 3, wherein the switching control circuit is further configured to generate the plurality of control signals based on a difference between a phase of the first sample signal and a phase of a second switching delay signal, generated in such a manner that the second switching signal is delayed, by taking into account a parasitic capacitance of the second switch.

5. The low-power DC-DC converter of claim 4, wherein the switching control circuit is further configured to:
   generate a first control signal having a pulse width activated based on a difference between the phase of the second switching delay signal and the phase of the first sample signal when the phase of the second switching delay signal lead the phase of the first sample signal; and
   generate a second control signal having a pulse width activated based on a difference between the phase of the first sample signal and the phase of the second switching delay signal when the phase of the first sample signal leads the phase of the second switching delay signal.

6. The low-power DC-DC converter of claim 5, wherein the switching control circuit is further configured to:
   increase a length of the second switching interval by the pulse width adjustment when the first control signal is generated; and
   reduce the length of the second switching interval by the pulse width adjustment when the second control signal is generated.

7. The low-power DC-DC converter of claim 4, wherein the switching control circuit is further configured to generate a digitized reference pulse selection control signal, in order to generate a second switching reference signal that is a reference for the second switching signal by selecting any one of a plurality of reference pulses by using the plurality of control signals.

8. A method of operating a low-power direct current-direct current (DC-DC) converter, the low-power DC-DC converter including a capacitor, an inductor electrically connected to the capacitor, a first switch configured to be turned on for a first switching interval in response to a first switching signal and to supply energy from an input power source to the inductor for the first switching interval, a second switch configured to be turned on for a second switching interval, other than the first switching interval, in response to a second switching signal and to electrically connect the inductor and a ground terminal to each other for the second switching interval, and a switching control circuit configured to generate the first switching signal and the second switching signal, the method comprising:

generating a first sample signal by sampling a voltage level of a first node where the first switch and the second switch are connected to the inductor;
generating a second switching delay signal based on the second switching signal;
detecting a faster one of the first sample signal and the second switching delay signal;
detecting a phase difference between the first sample signal and the second switching delay signal;
determining, responding to the first sample signal in time domain, a width of a pulse width adjustment adapted to adjust at least one of a length of a second switching interval which will be applied to a subsequent switching cycle and a length of a common blocking interval which will be applied to the subsequent switching cycle and for which the first switch and the second switch are all turned off; and
generating a plurality of control signals indicative of information about the faster one of the first sample signal, the width of the pulse width adjustment, and the second switching delay signal and quantified information about the phase difference between the first sample signal and the second switching delay signal,
wherein the width of the pulse width adjustment is at least one of a first width difference and a second width difference,
wherein the first width difference is a difference between a length of a second switching interval applied to a present switching cycle and the length of the second switching interval will be applied to the subsequent switching cycle,
wherein the second width difference is a difference between a length of a common blocking interval applied to the present switching cycle and the length of the common blocking interval will be applied to the subsequent switching cycle,
wherein the width of the pulse width adjustment is determined based on the first sample signal in time domain, and
wherein the determining comprises:
   determining the pulse width adjustment to be a first adjustment time width when the quantified level of the phase difference between the first sample signal and the second switching signal exceeds a threshold value;
   determining the pulse width adjustment to be a second adjustment time width shorter than the first adjustment time width when the quantified level of the phase difference between the first sample signal and the second switching signal is equal to or lower than the threshold value, and
   generating a first mode completion signal, indicating that a first mode in which the pulse width adjustment is determined to be the first adjustment time width has been completed and a second mode in which the pulse width adjustment is determined to be the second adjustment time width is asserted, when the quantified level of the phase difference between the first sample signal and the second switching signal becomes equal to or lower than the threshold value in the first mode.

9. The method of claim 8, wherein the determining comprises determining the width of the pulse width adjustment proportional to a phase difference between the first sample signal and the second switching signal.

* * * * *